(12) United States Patent
Kumar et al.

(10) Patent No.: US 11,501,023 B2
(45) Date of Patent: Nov. 15, 2022

(54) SECURE CHIP IDENTIFICATION USING RESISTIVE PROCESSING UNIT AS A PHYSICALLY UNCLONABLE FUNCTION

(71) Applicant: International Business Machines Corporation, Armonk, NY (US)

(72) Inventors: Arvind Kumar, Chappaqua, NY (US); Takashi Ando, Eastchester, NY (US); Dirk Pfeiffer, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 337 days.

(21) Appl. No.: 16/862,663

(22) Filed: Apr. 30, 2020

(65) Prior Publication Data
US 2021/0342489 A1 Nov. 4, 2021

(51) Int. Cl.
*H04L 9/08* (2006.01)
*G11C 29/44* (2006.01)
(Continued)

(52) U.S. Cl.
CPC ............. *G06F 21/75* (2013.01); *G06F 21/78* (2013.01); *G11C 13/004* (2013.01); *G11C 13/0064* (2013.01)

(58) Field of Classification Search
CPC .......... G06F 21/75; G06F 21/78; G06F 21/73; G11C 13/004; G11C 13/0064;
(Continued)

(56) References Cited

U.S. PATENT DOCUMENTS 9,313,135 B2  5/2016  Zhu et al.
9,343,135 B2  5/2016  Zhu et al.
(Continued)

FOREIGN PATENT DOCUMENTS

KR    101566949 B1   11/2015
WO    2016141386 A1   9/2016
WO    2020074996 A1   4/2020

OTHER PUBLICATIONS

A Novel Modeling Attack Resistant PUF Design based on Non-linear Voltage Transfer Characteristics, by Kundu et al. Published 2015 (Year: 2015).*

(Continued)

*Primary Examiner* — Vu V Tran
(74) *Attorney, Agent, or Firm* — Cantor Colburn LLP; L. Jeffrey Kelly (57) ABSTRACT

A technique relates to biasing, using a control system, a crossbar array of resistive processing units (RPUs) under a midrange condition, the midrange condition causing resistances of the RPUs to result in a random output of low values and high values in about equal proportions. The control system reinforces the low values and the high values of the random output by setting the resistances of the RPUs to a state that forces the low values and the high values having resulted from the midrange condition. Reinforcing the low values and the high values makes the random output permanent even when the crossbar array of the RPUs is not biased under the midrange condition. The control system records a sequence of the low values and the high values of the random output responsive to reinforcing the low values and the high values of the random output.

17 Claims, 8 Drawing Sheets

700

BIAS A CROSSBAR ARRAY OF RESISTIVE PROCESSING UNITS (RPUS) UNDER A MIDRANGE CONDITION, THE MIDRANGE CONDITION CAUSING RESISTANCES OF THE RPUS TO RESULT IN A RANDOM OUTPUT OF LOW VALUES AND HIGH VALUES IN ABOUT EQUAL PROPORTIONS 702

REINFORCE THE LOW VALUES AND THE HIGH VALUES OF THE RANDOM OUTPUT BY SETTING THE RESISTANCES OF THE RPUS TO A STATE THAT FORCES THE LOW VALUES AND HIGH VALUES HAVING RESULTED FROM THE MIDRANGE CONDITION 704

RECORD A SEQUENCE OF THE LOW VALUES AND THE HIGH VALUES OF THE RANDOM OUTPUT RESPONSIVE TO REINFORCING THE LOW VALUES AND THE HIGH VALUES OF THE RANDOM OUTPUT 706

(51) Int. Cl.
*G11C 29/50* (2006.01)
*G11C 13/00* (2006.01)
*G06F 21/73* (2013.01)
*G06F 21/75* (2013.01)
*G06F 21/78* (2013.01)

(58) Field of Classification Search
CPC ........ G11C 13/0059; G11C 2029/4402; G11C 2029/5002; H04L 9/0866
See application file for complete search history.

(56) References Cited

U.S. PATENT DOCUMENTS

| | | | |
|---|---|---|---|
| 9,806,718 B2 | 10/2017 | Wallrabenstein | |
| 9,985,791 B2 | 5/2018 | Cambou | |
| 9,997,244 B1 | 6/2018 | Chih et al. | |
| 10,103,895 B1* | 10/2018 | Tseng | H04L 9/0866 |
| 10,319,439 B1 | 6/2019 | Li et al. | |
| 10,469,271 B2 | 11/2019 | Hung et al. | |
| 2014/0042442 A1 | 2/2014 | Bruley et al. | |
| 2015/0028847 A1* | 1/2015 | Vanhoucke | G06F 21/73 324/72 |
| 2016/0148679 A1* | 5/2016 | Yoshimoto | G11C 13/004 365/148 |
| 2017/0109626 A1 | 4/2017 | Gokmen et al. | |
| 2018/0005110 A1 | 1/2018 | Gokmen et al. | |
| 2018/0075338 A1 | 3/2018 | Gokmen | |
| 2018/0176012 A1 | 6/2018 | Hung et al. | |
| 2018/0300622 A1 | 10/2018 | Gokmen et al. | |
| 2018/0316493 A1* | 11/2018 | Kvatinsky | H04L 9/3242 |
| 2018/0364785 A1* | 12/2018 | Hu | G11C 13/004 |
| 2019/0325291 A1 | 10/2019 | Gokmen et al. | |
| 2021/0036872 A1* | 2/2021 | Abeln | G11C 7/24 |
| 2021/0184870 A1* | 6/2021 | Hurwitz | G06F 21/73 |

OTHER PUBLICATIONS

PUFs: Myth, Fact or Busted? A Security Evaluation of Physically Unclonable Functions (PUFs) Cast in Silicon, by Katzenbeisser et al., published 2012 (Year: 2012).*

International Search Report; International Application No. PCTIB2021/052314; International Filing Date: Mar. 19, 2021; dated Apr. 30, 2020; 9 pages.

Chen, A., "Utilizing the Variability of Resistive Random Access Memory to Implement Reconfigurable Physical Unclonable Functions," IEEE Electron Device Letters, vol. 36, No. 2, 2015, pp. 138-140.

Gong, N. et al., "Signal and noise extraction from analog memory elements for neuromorphic computing," Nature Communications, vol. 9, No. 1, 2018, Article 2102, 8 pages.

Kim, H. et al., "Zero-shifting Technique for Deep Neural Network Training on Resistive Cross-point Arrays," Pohang University of Science and Technology, Pohang, Republic or Korea, 27 pages, Retrieved Mar. 30, 2020.

Steinbuch, "Die Lernmatrix", Kybernetik vol. 1, pp. 36-45, 1961, english abstract only, 9 pages.

* cited by examiner

BIAS A CROSSBAR ARRAY OF RESISTIVE PROCESSING UNITS (RPUS) UNDER A MIDRANGE CONDITION, THE MIDRANGE CONDITION CAUSING RESISTANCES OF THE RPUS TO RESULT IN A RANDOM OUTPUT OF LOW VALUES AND HIGH VALUES IN ABOUT EQUAL PROPORTIONS 702

↓

REINFORCE THE LOW VALUES AND THE HIGH VALUES OF THE RANDOM OUTPUT BY SETTING THE RESISTANCES OF THE RPUS TO A STATE THAT FORCES THE LOW VALUES AND HIGH VALUES HAVING RESULTED FROM THE MIDRANGE CONDITION 704

↓

RECORD A SEQUENCE OF THE LOW VALUES AND THE HIGH VALUES OF THE RANDOM OUTPUT RESPONSIVE TO REINFORCING THE LOW VALUES AND THE HIGH VALUES OF THE RANDOM OUTPUT 706

FIG. 8

SECURE CHIP IDENTIFICATION USING RESISTIVE PROCESSING UNIT AS A PHYSICALLY UNCLONABLE FUNCTION

BACKGROUND

The present invention generally relates to methods and system for integrated circuits (ICs), and more specifically, to methods and systems for secure chip identification using resistive processing units (RPUs) as a physically unclonable function.

A physical unclonable function (sometimes also called physically unclonable function), or PUF, is a physical object that for a given input and conditions (challenge), provides a physically-defined "digital fingerprint" output (response) that serves as a unique identifier, most often for a semiconductor device such as a microprocessor. A PUF is a physical entity embodied in a physical structure. PUFs are usually implemented in integrated circuits (ICs) and are typically used in applications with high security requirements. ICs (also referred to as a chip or a microchip) include a large number electronic devices that form the electronic circuits on the wafer. The wafer can be a semiconductor material, such as, for example, silicon or other materials.

SUMMARY

A non-limiting example of computer-implemented method for identification includes biasing, using a control system, a crossbar array of resistive processing units (RPUs) under a midrange condition, the midrange condition causing resistances of the RPUs to result in a random output of low values and high values in about equal proportions. The computer-implemented method includes reinforcing, using the control system, the low values and the high values of the random output by setting the resistances of the RPUs to a state that forces the low values and the high values having resulted from the midrange condition. Reinforcing the low values and the high values makes the random output permanent even when the crossbar array of the RPUs is not biased under the midrange condition. Also, the computer-implemented method includes recording, using the control system, a sequence of the low values and the high values of the random output responsive to reinforcing the low values and the high values of the random output.

A non-limiting example of computer program product includes a computer readable storage medium having program instructions embodied therewith, the program instructions executable by a processor to cause the processor to perform operations. The operations include biasing a crossbar array of resistive processing units (RPUs) under a midrange condition, the midrange condition causing resistances of the RPUs to result in a random output of low values and high values in about equal proportions. The operations include reinforcing the low values and the high values of the random output by setting the resistances of the RPUs to a state that forces the low values and the high values having resulted from the midrange condition. Reinforcing the low values and the high values makes the random output permanent even when the crossbar array of the RPUs is not biased under the midrange condition. Also, the operations include recording a sequence of the low values and the high values of the random output responsive to reinforcing the low values and the high values of the random output.

A non-limiting example of a system includes a memory having computer readable instructions, and one or more processors for executing the computer readable instructions, the computer readable instructions controlling the one or more processors to perform operations. The operations include biasing a crossbar array of resistive processing units (RPUs) under a midrange condition, the midrange condition causing resistances of the RPUs to result in a random output of low values and high values in about equal proportions. The operations include reinforcing the low values and the high values of the random output by setting the resistances of the RPUs to a state that forces the low values and the high values having resulted from the midrange condition. Reinforcing the low values and the high values makes the random output permanent even when the crossbar array of the RPUs is not biased under the midrange condition. The operations include recording a sequence of the low values and the high values of the random output responsive to reinforcing the low values and the high values of the random output.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified.

Also, the term "coupled" and variations thereof describes having a communications path between two elements and does not imply a direct connection between the elements with no intervening elements/connections between them. All of these variations are considered a part of the specification.

In the accompanying figures and following detailed description of the embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Semiconductor supply chain integrity is an important security need, particularly for sensitive industries. Accordingly, industries need to verify that chips installed in critical systems are authentic. For example, phony or counterfeit components, if substituted for real ones, can contain malicious circuitry. However, a unique and reproducible digital fingerprint or pattern can be utilized for chip authentication, thereby verifying the integrity of the chip's supply chain according to one or more embodiments of the invention.

One or more embodiments of the invention provide methods and structures to reinforce a stochastic pattern generated by a crossbar array of resistive processing units (RPUs). One or more embodiments of the invention generate a unique and reproducible digital fingerprint or pattern for chip authentication. A crossbar array of RPUs functions as a physically unclonable function (PUF) capable of generating the unique digital fingerprint or pattern to identify a chip. Due to its stochastic nature, the PUF cannot be replicated exactly on another chip and can thus serve to uniquely identify the chip as being authentic. Although the PUF is used to generate a stochastic pattern for unique identification, a reinforcement technique is utilized to harden the initial pattern or unique digital fingerprint so that it can be reliably reproduced according to one or more embodiments of the invention.

Figure 1A:
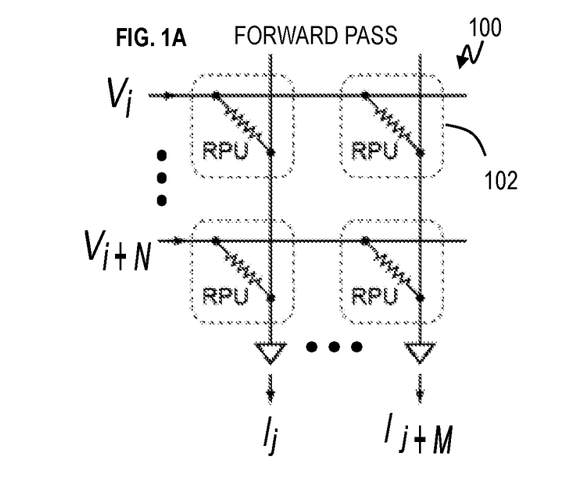
FIG. 1A depicts a schematic of a crossbar array of resistive processing units (RPUs) in forward pass according to one or more embodiments of the invention.
Figure 1B:
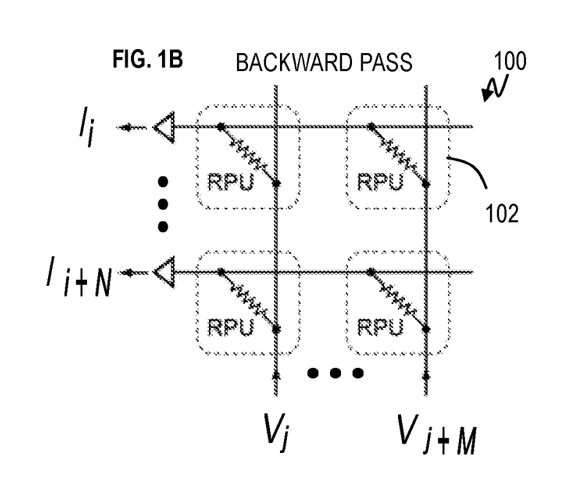
FIG. 1B depicts a schematic of the crossbar array of RPUs in backward pass according to one or more embodiments of the invention.
Figure 1C:
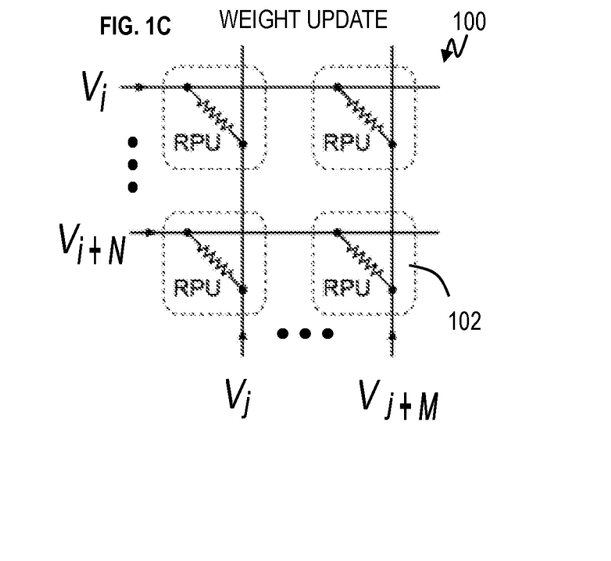
FIG. 1C depicts a schematic of the crossbar array of RPUs in weight update according to one or more embodiments of the invention.

Turning now to a more detailed description of aspects of the present invention, FIG. 1A depicts a schematic of a crossbar array of resistive processing units (RPUs) in forward pass. FIG. 1B depicts a schematic of the crossbar array of RPUs in backward pass. FIG. 1C depicts a schematic of the crossbar array of RPUs in weight update. A crossbar array 100 of RPUs 102, also known as cross-point arrays or crosswire arrays, are high density circuit architectures used to form a variety of electronic circuits and devices. The configuration of crossbar array 100 includes a set of conductive row wires and a set of conductive column wires formed to intersect the set of conductive row wires. The intersection between the two sets of wires are separated by cross-point devices, such as RPUs 102.

The RPUs 102 are analog resistive devices that change resistance (or inversely conductance) when subjected to positive or negative voltage pulse stimuli. Each RPU 102 is a two-terminal analog resistive device altered by controlling the voltages applied between individual wires of a row and column. During the forward pass depicted in FIG. 1A, voltages or voltage pulses (e.g., voltage $V_i$ through voltage $V_{i+N}$, where i is the first row and N equals the next to last row) are respectively applied to the row wires (e.g., row i through row i+N, respectively) to generate an output of current readings (e.g., current $I_j$ through current $I_{j+M}$) on the column wires (e.g., column j through column j+M, where j is the first column and M is the next to last column). The input voltages can be from an input vector (e.g., voltage $V_i$ through voltage $V_{i+N}$). The current readings (e.g., current $I_j$ through current $I_{j+M}$) are the resulting vector or output vector in FIG. 1A. The conductance values (g) or inversely the resistance values (R) of the respective RPUs 102 in the crossbar array 100 form the matrix. The matrix can be utilized for various operations as understood by one skilled in the art. The electrical current in each column is converted to a digital value (i.e., low or high, e.g., 0 or 1) by periphery circuits. The periphery circuitry can include analog-to-digital converters (ADCs) for converting the analog signal to a digital output, operational amplifiers (op-amps) coupled to ADCs, line drivers used to direct signals along the columns and rows, etc.

As seen in FIG. 1B, the backward pass interchanges the voltage and current positions. During the backward pass, voltages or voltage pulses (e.g., voltage $V_j$ through voltage $V_{j+M}$, where j is the first column and M equals the next to last column) are respectively applied to the column wires (e.g., column j through column j+M, respectively) to generate an output of current readings (e.g., current $I_i$ through current $I_{i+N}$) on the row wires (e.g., row i through row i+N).

During the weight update depicted in FIG. 1C, voltages or voltage pulses (e.g., voltage $V_i$ through voltage $V_{i+N}$) are respectively applied to the row wires (e.g., row i through row i+N, respectively) while concurrently applying voltages or voltage pulses (e.g., voltage $V_j$ through voltage $V_{j+M}$) to the column wires (e.g., column j through column j+M, respectively), thereby updating/changing the conductance values or resistance values on the RPUs 102.

In accordance with one or more embodiments of the invention, the crossbar array 100 of RPUs 102 is configured to function as a physically unclonable function (PUF) configured to generate a unique digital fingerprint to identify a chip. Because of its stochastic nature, the PUF cannot be replicated exactly on another chip and can thus serve to uniquely identify the chip as being authentic. According to one or more embodiments of the invention, the pattern produced by the PUF is to be reproducible to ensure reliable authentication of the chip. Although the PUF can be used to generate a stochastic pattern for unique identification, embodiments of the invention provide a reinforcement technique to harden the initial pattern so that the pattern can be reliably reproduced.

Figure 2:
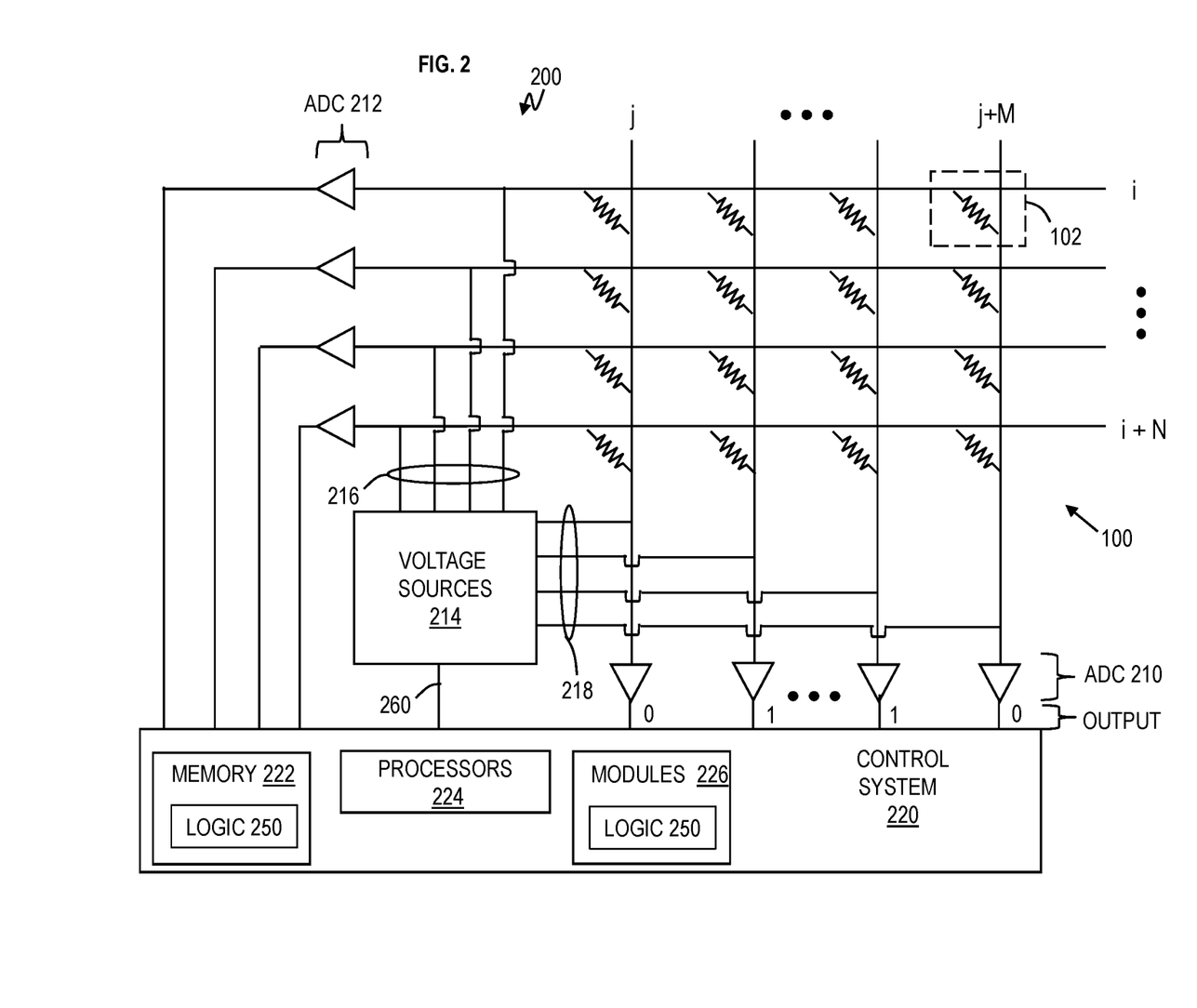
FIG. 2 depicts a schematic of a system that uses the crossbar array of RPUs according to one or more embodiments of the invention.

FIG. 2 depicts a schematic of a system 200 that uses the crossbar array 100 according to one or more embodiments of the invention. The system 200 includes the crossbar array 100 of RPUs 102 formed on a chip (such as chip 600 depicted in FIG. 6). Although only one RPU 102 is highlighted, it is noted that an RPU 102 is present at each cross-point of the row wires and column wires. As discussed herein, the crossbar array 100 includes row i though i+N which each cross column j through column j+M. In some cases, N equals M and in other cases N is greater than or less than M. Periphery circuitry is coupled to the crossbar array 100. The periphery circuitry can include but is not limited to analog-to-digital converters (ADCs) 212 respectively coupled to individual row i through i+N and ADCs 210 respectively coupled to individual columns j through j+M. A control system 220 is configured to control voltages sources 214 coupled to individual row i through i+N and individual columns j through j+M during the forward pass, backward pass, and weight update. In one or more embodiments of the invention, the control system 220 can be a controller or microcontroller formed as an integrated circuit on the chip 600 in FIG. 6. The circuitry to convert the analog values from the crossbar array 100 to the digital code can be integrated underneath the crossbar array 100. For example, the crossbar array 100 can be integrated in the back-end-of-line (BEOL) wiring structure, so as not to be on the same plane as the circuitry converting the analog values to digital values, thereby making delayering and probing much more difficult.

Particularly, the control system 220 controls the voltages or voltage pulses (e.g., voltage $V_i$ through voltage $V_{i+N}$) respectively applied to the row wires (e.g., row i through row i+N, respectively) and voltages or voltage pulses (e.g., voltage $V_j$ through voltage $V_{j+M}$) respectively applied to the column wires (e.g., column j through column j+M, respectively) at appropriate times. The control system 220 can be implemented using various techniques. In one or more embodiments of the invention, the control system 220 can include computer-executable instructions stored and/or coupled to computer-readable memory 222. One or more processors 224 are configured to execute/read the computer-executable instructions to perform functions as discussed herein. The computer-executable instructions can represent and/or include logic 250 performed by the processors 224 according to embodiments of the invention.

In one or more embodiments of the invention, the control system 220 can include one or more modules 226 configured to perform logic 250 which can include logic circuits. The modules 226 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. As examples, the modules 226 can be a combination of hardware and programming. The programming can be processor executable instructions stored on a tangible memory, and the hardware can include processing circuitry for executing those instructions. Thus a system memory can store program instructions that when executed by processing circuitry implement the modules 226 described herein. Alternatively or additionally, the modules 226 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Referring to FIG. 2, conductive lines 216 individually couple voltage sources 214 to row wires (e.g., row i through row i+N, respectively) and conductive lines 218 individually couple column wires (e.g., column j through column j+M, respectively). Conductive line 260 couples the voltage sources 214 to the control system 220.

Figure 3:
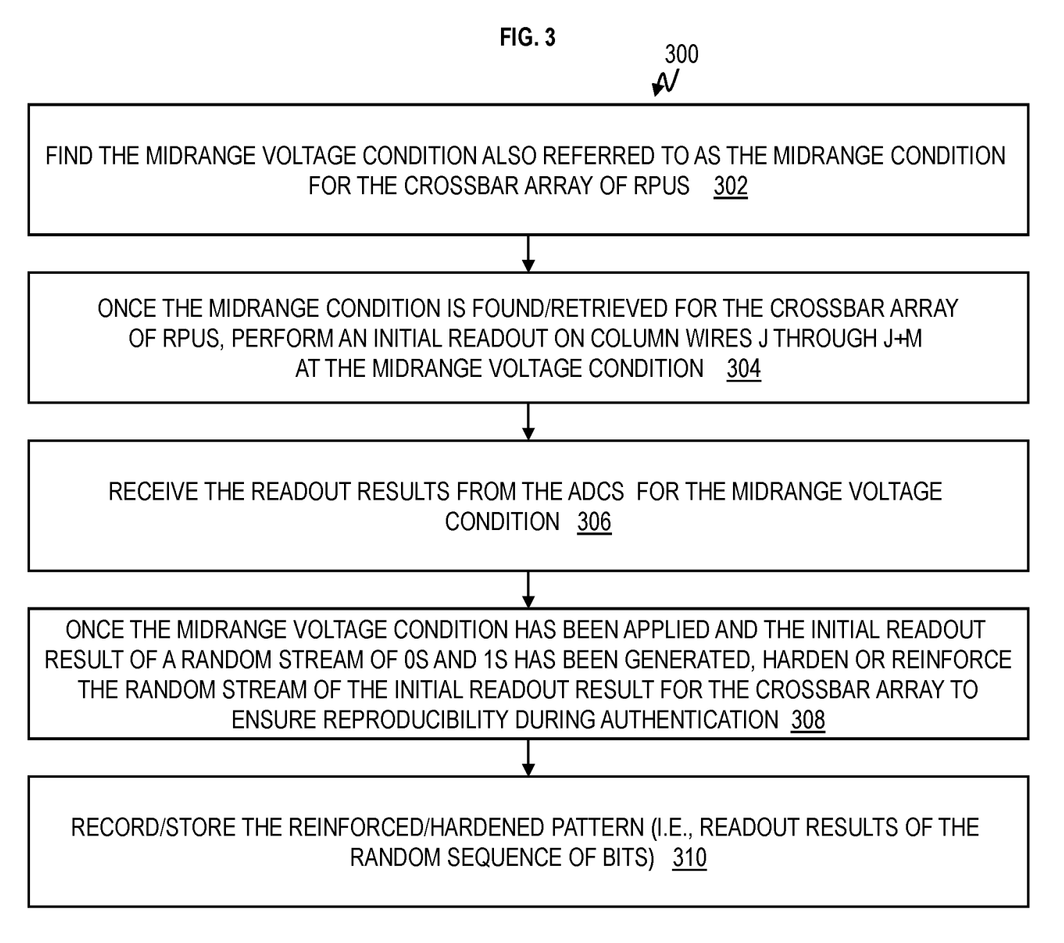
FIG. 3 depicts a flowchart of a method of securing chip identification using a crossbar array of RPUs as a physically unclonable function (PUF) according to one or more embodiments of the invention.

FIG. 3 depicts a flowchart of a method 300 for securing chip identification using a crossbar array of resistive processing units (RPUs) as a physically unclonable function (PUF) in a chip (e.g., such as chip 600 depicted in FIG. 6) according to one or more embodiments of the invention. As discussed herein, logic 250 of control system 220 can be performed by processors 224 executing computer-executable instructions in memory 222 and/or performed by modules 226. The control system 220 causes and/or performs various processes on the crossbar array 100 of RPUs 102 in accordance with logic 250 to accomplish one or more embodiments of the invention.

Turning to the method 300, at block 302, the control system 220 is configured to find the midrange voltage condition also referred to as the midrange condition for the crossbar array 100 of RPUs 102. In some embodiments of the invention, the midrange condition (or manufacturing property) is configured in logic 250, stored in memory 222, and/or stored/configured in modules 226 of the control system 220. In one or more embodiments of the invention, the midrange condition can be obtained from the manufacturer or retrieved from specifications of the crossbar array 100 of RPUs 102 and utilized as discussed herein.

The midrange condition or midrange voltage condition defines the voltage or voltage pulses that cause the RPUs 102 in the crossbar array 100 to have an equal probability and/or about an equal probability of outputting an even distribution of 0s and 1s (e.g., low values and high values), and the midrange condition or midrange voltage condition is based on a manufacturing property of the RPUs 102. The resistance of an RPU 102 is a function of the voltage applied (i.e., voltage bias) but the resistance has stochastic fluctuations. When applying alternating voltage pulses with opposite polarities (e.g., positive and negative) to the crossbar array 100 of RPUs 102 at the midrange condition, the threshold for '0' and '1' is at a balance point (i.e., resistance is balanced) and each RPU 102 has a 0.5 probability of outputting a '0' or '1' on the respective columns via ADCs 210. For the readout of the randomly generated distribution of '0' and '1', a different sensing voltage, which is significantly lower than the midrange voltage condition, is used such that the readout process does not disturb the original distribution. The original distribution generated by the midrange voltage condition is typically noisy, so the '0's and the '1's are reinforced to have extreme values by utilizing weight update sequences to increase the sensing margin.

The midrange condition is based on the symmetric point of switching between 0 and 1 (e.g., low value and high value) in the analog RPU, such as for example, resistive random access memory (ReRAM or RRAM). As such, there is a 50/50 probability of either being 0 or 1. According to one or more embodiments of the invention, analog RRAM is used to obtain a random distribution around the symmetric point of switching and then the random distribution is reinforced to binary states as discussed further herein.

At block 304, once the midrange condition is found/retrieved for the crossbar array 100 of RPUs 102, the control system 220 is configured to perform an initial readout on column wires j through j+M at the midrange voltage condition. By applying voltages or voltage pulses (e.g., voltage $V_i$ through voltage $V_{i+N}$) to the row wires (e.g., row i through row i+N, respectively) via voltage sources 214, the control system 220 is configured to voltage bias the crossbar array 100 at a midrange voltage condition such that the resistances of the RPUs 102 output '0' and '1' in nearly equal proportions (i.e., 50/50 probability) column wires j through j+M. The initial readout can be stored in the control system 220, for example, in memory 222.

At block 306, the control system 220 receives the readout results from the ADCs 210 for the midrange voltage condition. By using the midrange voltage condition, this results in a random or stochastic generation for the output of the initial readout. The output of the initial readout is a sequence of bits corresponding to positions at column wires j through j+M. For example, each ADC 210 could perform a 1-bit analog-to-digital conversion to produce the initial readout result. The initial readout result is a random stream of bits. As noted above, this initial readout using the midrange voltage condition is stochastic or random and therefore results in different values even repeated under the same midrange voltage condition, thereby making the initial readout unique. For explanation purposes, the initial readout result could be a random stream of bits 01 . . . 10.

At block 308, once the midrange voltage condition has been applied and the initial readout result of a random stream of 0s and 1s has been generated, the control system 220 is configured to harden or reinforce the random stream of the initial readout result for the crossbar array 100 to ensure reproducibility during subsequent authentication. In one or more embodiments of the invention, the control system 220 can perform a weight update to the crossbar array 100 of RPUs 102. During the reinforcement or hardening of the random stream of bits in the initial readout result, the control system 220 is configured to change the resistances of RPUs 102 to resistance values that ensure/guarantee an output of values that match the random stream of bits in the initial readout result each time the forward pass (i.e., readout) occurs. As discussed herein, each column j through column j+M outputs a value or bit form the random stream of bits. The control system 220 is configured to determine the RPUs 102 coupled to each column j through column j+M and determine the resistances for each RPU 102 per column that are to be utilized to ensure a matching bit in the output, thereby making the resistances of the RPUs 102 in the crossbar array 100 function to generate the same the initial readout result each time. This removes the randomness or stochasticity for readouts subsequent to the initial readout. For example, during the reinforcement or hardening, voltages or voltage pulses (e.g., voltage $V_i$ through voltage $V_{i+N}$) are respectively applied to the row wires (e.g., row i through row i+N, respectively) while concurrently applying voltages or voltage pulses (e.g., voltage $V_j$ through voltage $V_{j+M}$) to the column wires (e.g., column j through column j+M, respectively), such that these voltage pulses for both rows and columns cause the resistances of the RPUs 102 to generate the same the initial readout result as the output each time. This weight update applies voltage pulses from the voltage sources 214 in order to shift the resistance values up or down to reinforce each '0' and '1' from initial readout result until a reliably reinforced state is obtained. To ensure that the weight update is correct, the control system 220 can compare the initial readout result to after reinforcement or hardening of the random stream of bits. If there is an error in or more bits, one or more parts of the weight update can be repeated to correct the error.

In the case of resistive random access memory (ReRAM or RRAM) or phase-change memory (PCM), these states would correspond to the fully SET and RESET states of low and high conductance, respectively. Resistive random access memory is a type of non-volatile random-access (RAM) computer memory that works by changing the resistance across a dielectric solid-state material, often referred to as a memristor. Phase-change memory is a type of non-volatile random-access memory According to one or more embodiments of the invention, further security measures or obfuscation can be implemented by the control system 220 performing a random choice of the bits to be used, and the random selection of bits is unknown to the manufacturer. For example, 1000 bits could be selected from a large 512×512=262k array as a security PUF. Accordingly, the initial readout results include 1000 bits. Instead of using the entire 1000 bits in the exact order read out, the control system 220 can have variations to both the number of bits selected and the bit positions selected. The control system 220 is configured to select a predefined random number of the total random number of the bits (e.g., 100, 202, 250, 500, 800, 900, 1000 bits) and/or select various bit positions, and these selected bits in the various bit positions are utilized as discussed herein.

At block 310, the control system 220 is configured to record/store the reinforced/hardened random pattern (i.e., readout results of the random sequence of bits) generated from block 308 in an initiator or memory device such as a computer system/server. An example of a computer system/server that records/stores the reinforced/hardened random pattern (i.e., readout results of the random sequence of bits) is depicted as example computer system/server 812 depicted in FIG. 8. Before deploying the chip for use, the control system 220 can be instructed to perform a forward pass and/or readout of the chip, such that the computer system/server can compare the stored reinforced/hardened random pattern to the pattern recently read out; this ensures that the method 300 performed correctly. If one or more of the bits were not set correctly, method 300 can be repeated. Additionally, the initial readout is removed and/or erased from control system 220 prior to deployment of the chip.

Figure 6:
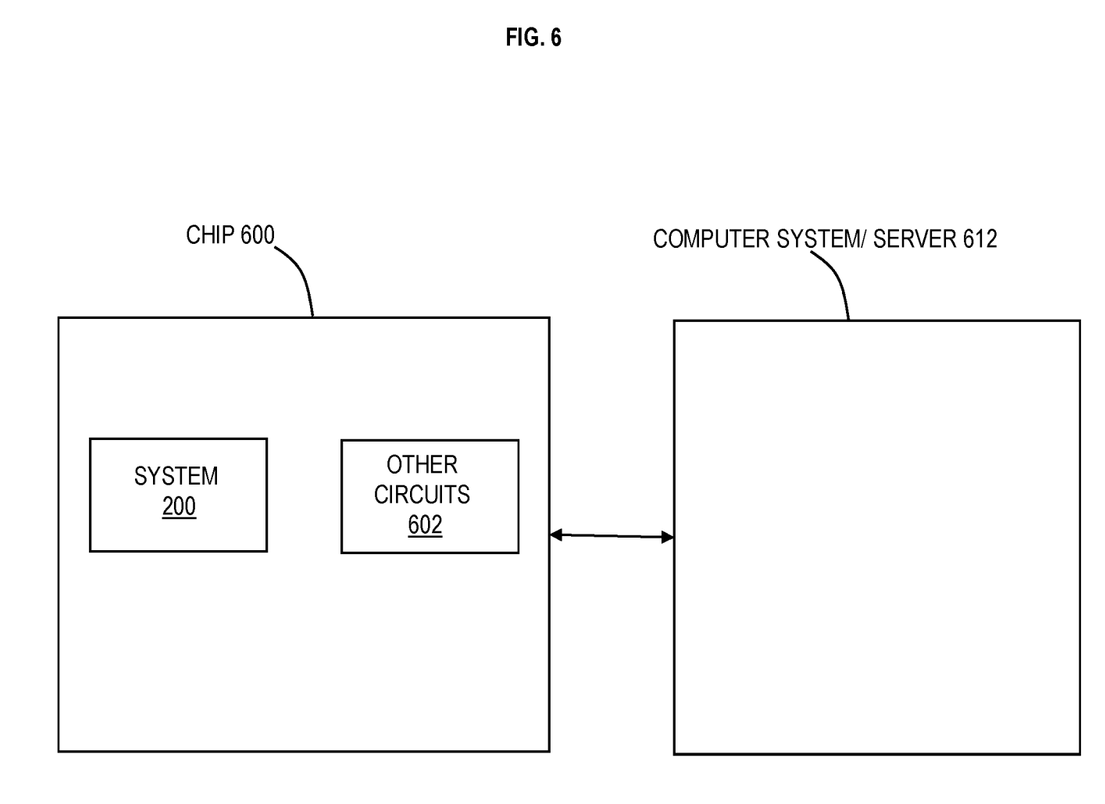
FIG. 6 depicts a block diagram of a chip according to one or more embodiments of the invention.
Figure 8:
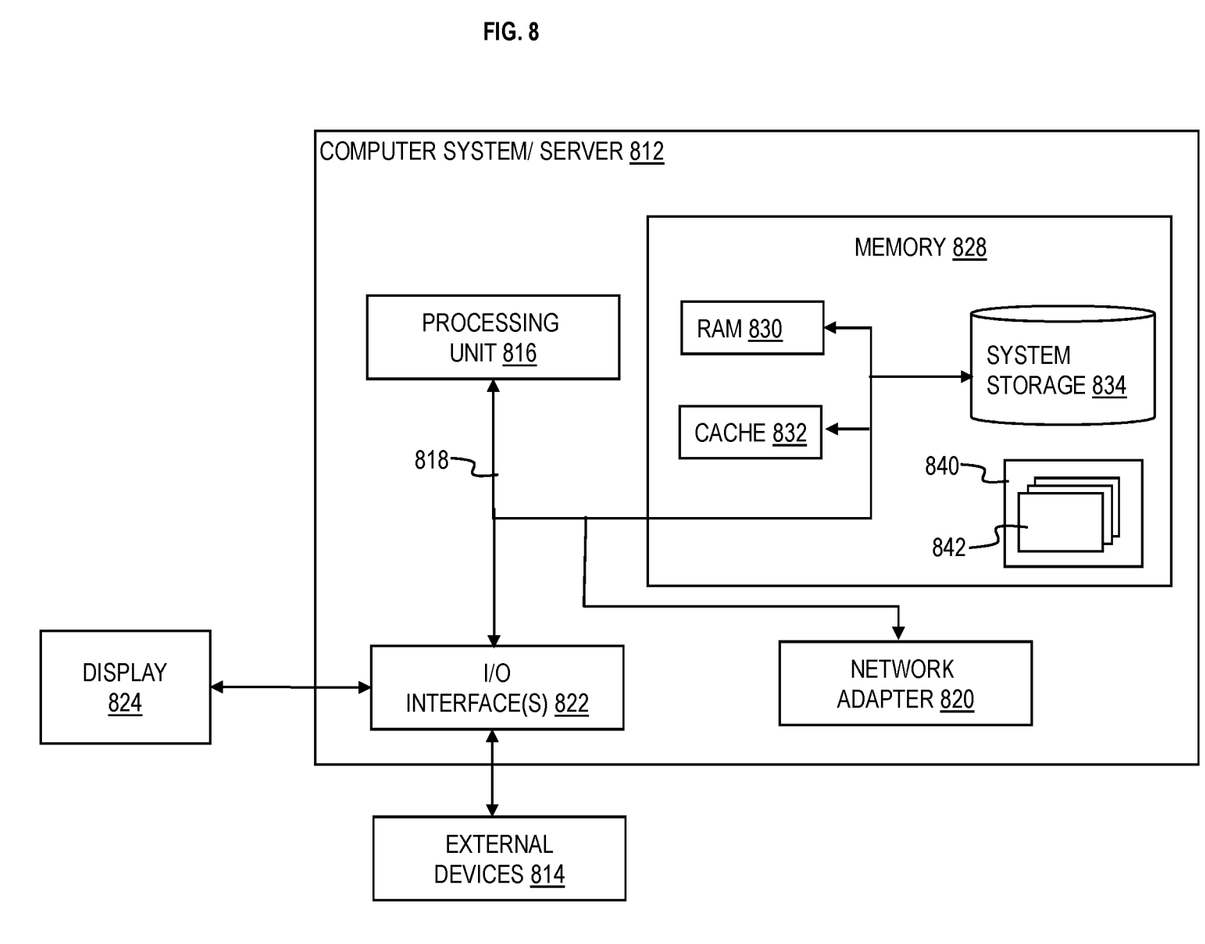
FIG. 8 depicts a schematic of an example computing system having functions and features utilized in accordance with one or more embodiments of the invention.

Further, a computer system/server 612 depicted in FIG. 6 (which can include the functions and/or elements of example computer system/server 812 depicted in FIG. 8) can include and/or be coupled to the chip 600. The computer system/server 612 can receive and/or be sent the reinforced/hardened random pattern (i.e., readout results of the random sequence of bits) from another computer system/server (e.g., such as example computer system/server 812 depicted in FIG. 8) which previously stored the pattern in block 310. When the chip 600 is subsequently deployed for use in, for example, computer system/server 612, the control system 220 (as instructed by the computer system/server 612) can be utilized to verify the authenticity of the chip 600 such that the crossbar array 100 of RPUs 102 on the chip 600 can be verified by reading out the random pattern using the forward pass (e.g., of existing RPU circuitry). The computer system/server 612 compares this newly output pattern to the stored random pattern (i.e., the previous readout results of the random sequence of bits) to determine a match. A match confirms that the chip 600 is authentic, while no match indicates that the chip is not authentic.

Various techniques can be utilized to ensure that no further weight updates are possible to change the resistances (or conductances) of the RPUs 102 in the crossbar array 100 after the reinforcement process. In one or more embodiments of the invention, the control system 220 is configured to disable a portion of logic 250 used for weight updates. For example, the weight update portion of logic 250 can be overwritten.

Figure 4:
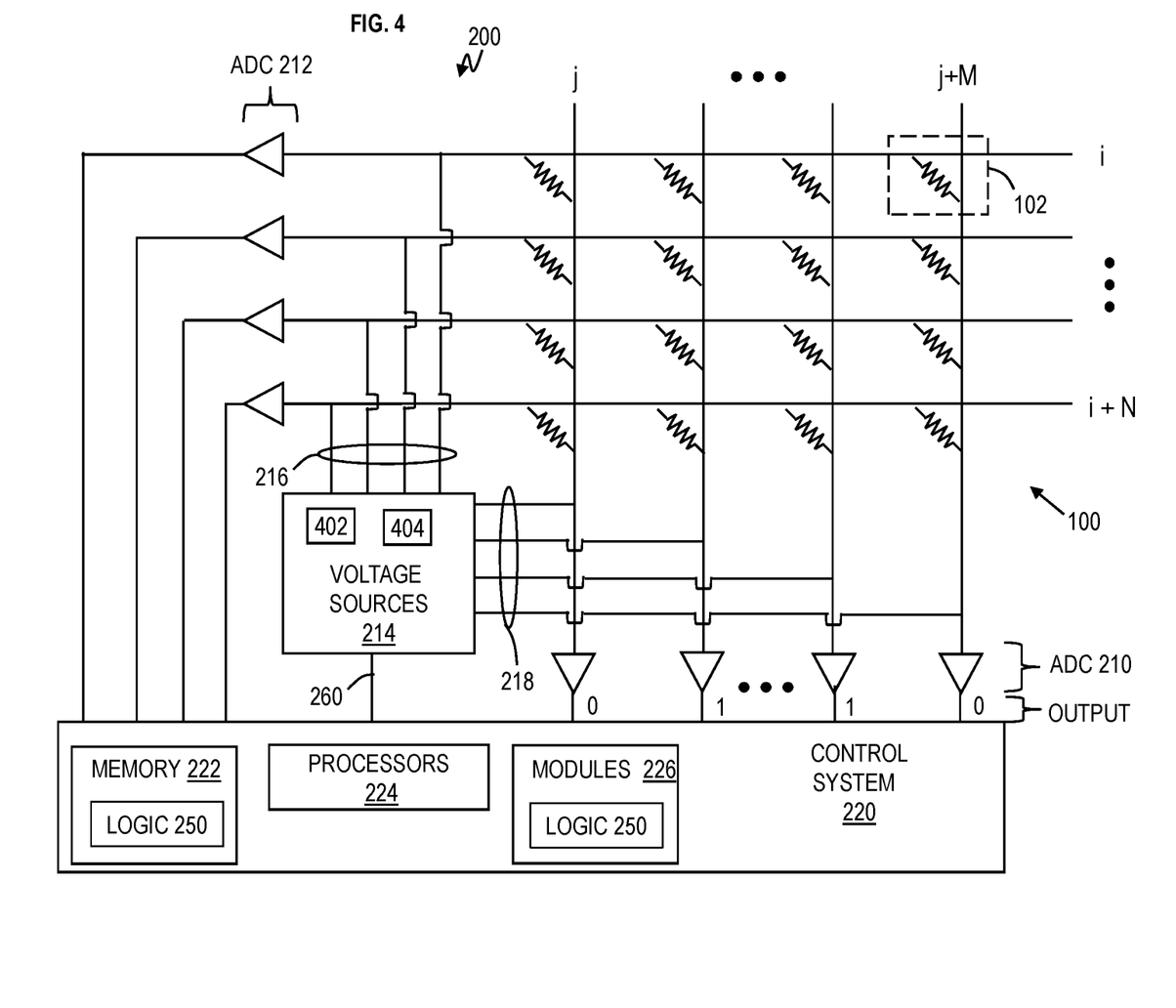
FIG. 4 depicts a schematic of a system that uses the crossbar array of RPUs according to one or more embodiments of the invention.

Weight update requires higher voltages than the forward pass or even the backward pass. In one or more embodiments of the invention, higher voltage circuits 402 used for weight updates in the voltage sources 214 can be disabled while lower voltage circuits 404 used for the forward pass (i.e., reading out the output) remain intact as depicted in FIG. 4. As one example, electronic fuses (eFuses) can be blown in the higher voltage circuits 402 such that weight updates can no longer occur.

Figure 5:
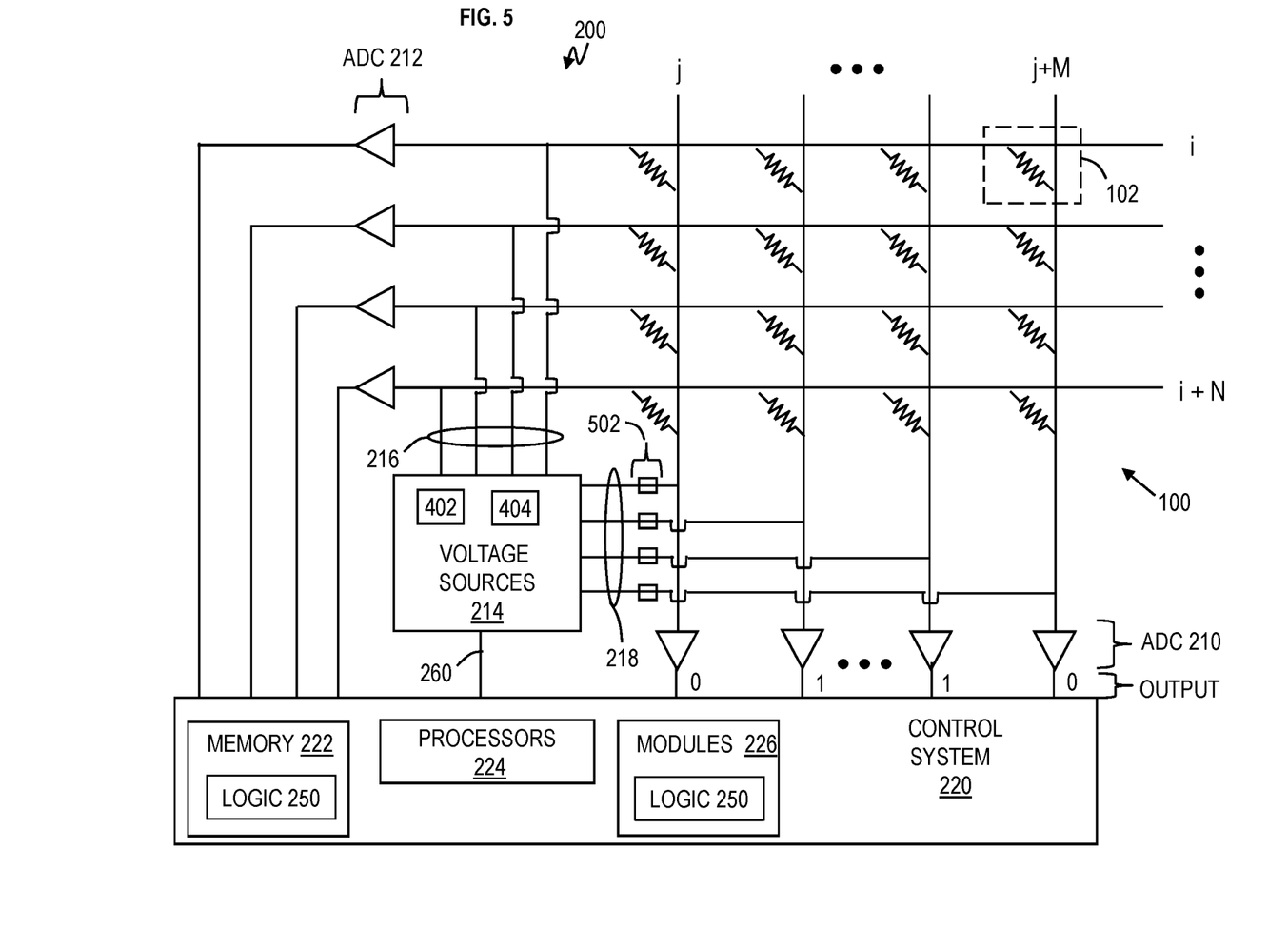
FIG. 5 depicts a schematic of a system that uses the crossbar array of RPUs according to one or more embodiments of the invention.

FIG. 5 depicts a schematic of the system 200 that uses the crossbar array 100 according to one or more embodiments of the invention. In FIG. 5, eFuses 502 interrupt each of the conductive lines 218 connecting the voltage sources 214 to their respective column wires j through j+M. The control system 220 is configured to blow or disable the eFuses 502 on conductive lines 218 connected to column wires j through j+M, thereby disabling the weight update.

FIG. 6 depicts a block diagram of a chip 600 according to one or more embodiments of the invention. The chip 600 includes the system 200 for secure chip identification along with other integrated circuits 602 that function as understood by one skilled in the art. As discussed herein, the system 200 uniquely identifies the chip 600 using the crossbar array 100 of RPUs 102. Particularly, the system 200 ensures that the reinforced/hardened random pattern (i.e., readout results of the random sequence of bits) can be read out and verified, thereby ensuring the authenticity of the chip 600 as discussed herein. For example, the chip 600 can be deployed in and/or used in conjunction with computer system/server 612, which has previously stored the reinforced/hardened random pattern (i.e., readout results of the random sequence of bits). The computer system/server 612 can instruct and/or cause the control system 220 to read out the random pattern using the forward pass, for comparison against the previously stored the reinforced/hardened random pattern. A match ensures the operator that the deployed chip 600 is authentic.

The crossbar array 100 of RPUs 102 can be utilized for various functions of the chip 600. A resistive processing unit is an analog element with the potential to accelerate matrix operations used in artificial intelligence (AI) workloads. Crossbar arrays of RPUs can be implemented on the chip 600 as an AI accelerator.

Figure 7:
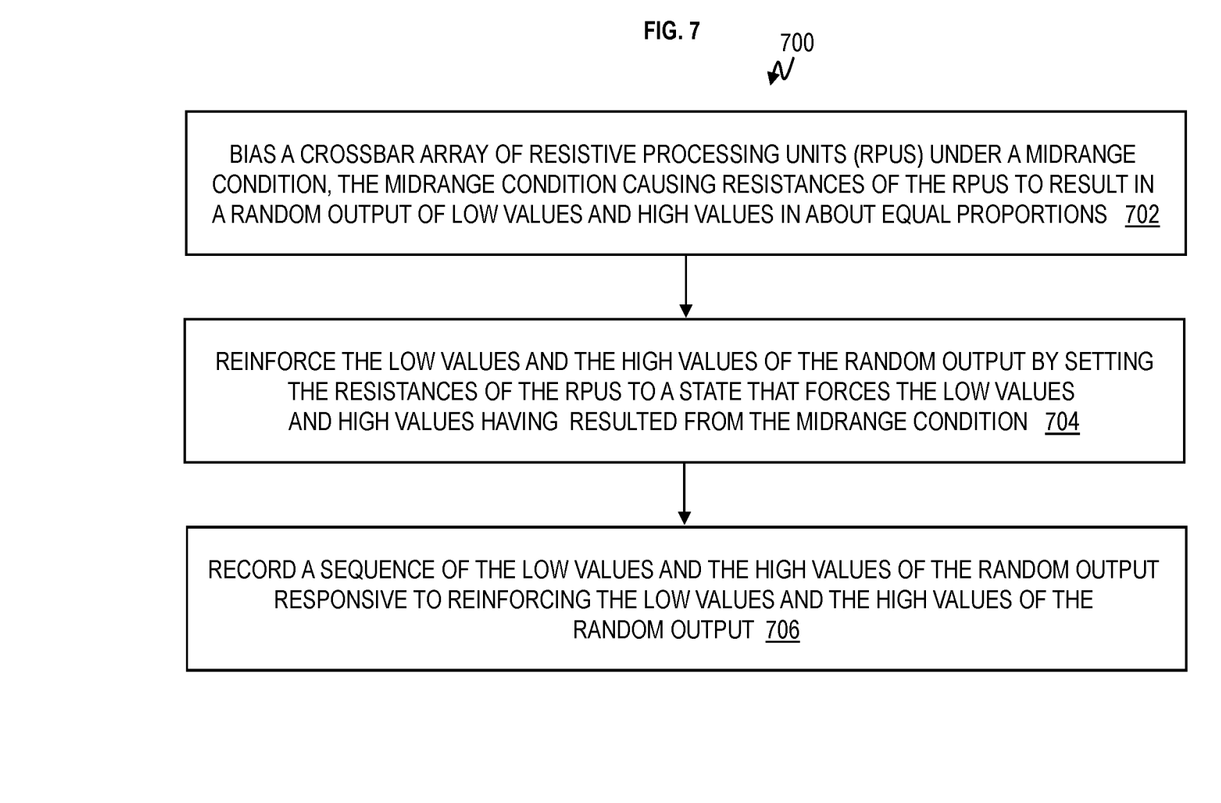
FIG. 7 depicts a flow chart of a method for chip identification according to one or more embodiments of the invention.

FIG. 7 is a flow chart of a method 700 of chip identification according to one or more embodiments of the invention. At block 702, the method 700 via control system 220 includes biasing a crossbar array 100 of resistive processing units (RPUs) 102 under a midrange condition, the midrange condition causing resistances of the RPUs 102 to result in a random output of low values (e.g., 0s) and high values (e.g., 1s) in about equal proportions. By controlling voltage systems 214, the control system 220 is configured to cause voltages or voltage pulses (e.g., voltage $V_i$ through voltage $V_{i+N}$) to be applied to the row wires (e.g., row i through row i+N, respectively) of the crossbar array 100 of RPUs 102. At block 704, the method 700 via control system 220 includes reinforcing the low values and the high values of the random output by setting the resistances of the RPUs 102 to a state that forces the low values and high values having resulted from the midrange condition. By controlling voltage systems 214, the control system 220 is configured to cause voltages or voltage pulses (e.g., voltage $V_i$ through voltage $V_{i+N}$) to be applied to the row wires (e.g., row i through row i+N, respectively) while concurrently applying voltages or voltage pulses (e.g., voltage $V_j$ through voltage $V_{j+M}$) to the column wires (e.g., column j through column j+M, respectively). Further, reinforcing the low values and the high values makes the random output permanent even when the crossbar array 100 of the RPUs 102 is not subsequently biased under the midrange condition. In other words, reinforcing the low values and the high values of the random output causes the crossbar array 100 to repeatedly (and permanently) output the result which is the exact same random output (i.e., exact same sequence of low values (e.g., 0s) and high values (e.g., 1s) in equal proportions as output under the midrange condition) even when the crossbar array 100 is not (or no longer) in the midrange condition, such as when the crossbar array 100 is in forward pass. At block 706, the method 700 via control system 220 causes recording (off chip) of a sequence of the low values and the high values of the random output responsive to reinforcing the low values and the high values of the random output. The sequence of the low values and the high values of the random output can be recorded in a computer system/server as discussed herein.

The RPUs 102 have a relationship in which predefined voltages (e.g., applied to row i through row i+N, respectively) under the midrange condition generate a stochastic response. The RPUs have a relationship in which predefined voltages under the midrange condition generate a stochastic response of the low values and the high values in the about equal proportions. Reinforcing the low values and the high values of the random output by setting the resistances of the RPUs to the state that forces the low values and high values having resulted from the midrange condition includes using voltage pulses under the midrange condition that drive the resistances of the RPUs. Reinforcing the low values and the high values of the random output by setting the resistances of the RPUs to the state that forces the low values and high values having resulted from the midrange condition includes using voltage pulses to shift resistance values up and down to ensure the low values and the high values in the about equal proportions.

The crossbar array 100 of the RPUs 102 is configured to be authenticated by reading out a verification sequence that matches the random output, the verification sequence being read out under a different condition than the midrange condition. Also, the method 700 includes preventing the resistances of the RPUs 102 from being subsequently programmed, responsive to recording the sequence of the low values and the high values of the random output.

FIG. 8 depicts a schematic of an example computing system 812 having functions and features utilized according to one or more embodiments. The computer system 812 can be operational with numerous other general purpose or special purpose computing system environments or configurations. The computer system 812 can be representative of various types of computer systems or servers on which operations and functions can execute as discussed herein. The functions and capabilities of computing system 812 can be utilized in FIGS. 1-7 to implement one or more features of the computer system/server used to store the reinforced/hardened random pattern (i.e., readout results of the random sequence of bits), the computer system/server 612 in which the chip is deployed, the control system 220, etc., according to embodiments.

Computer system 812 may be described in the general context of computer system-executable instructions, such as program modules, being executed by a computer system. Generally, program modules may include routines, programs, objects, components, logic, data structures, and so on that perform particular tasks or implement particular abstract data types. Computer system 812 may be practiced in distributed cloud computing environments where tasks are performed by remote processing devices that are linked through a communications network. In a distributed cloud computing environment, program modules may be located in both local and remote computer system storage media including memory storage devices.

The components of computer system 812 may include, but are not limited to, one or more processors or processing units 816, a system memory 828, and a bus 818 that couples various system components including system memory 828 to processor 816. Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 812 typically includes a variety of computer system readable media. Such media may be any available media that is accessible by computer system 812, and it includes both volatile and non-volatile media, removable and non-removable media. The system memory 828 can include computer system readable media in the form of volatile memory, such as random access memory (RAM) 830 and/or cache memory 832. Computer system 812 may further include other removable/non-removable, volatile/non-volatile computer system storage media. By way of example only, storage system 834 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. Memory 828 may include at least one program product having a set (e.g., at least one) of program modules that are configured to carry out the functions of embodiments.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments as described herein.

Computer system 812 may also communicate with one or more external devices 814 such as a keyboard, a pointing device, a display 824, etc.; one or more devices that enable a user to interact with computer system 812; and/or any devices (e.g., network card, modem, etc.) that enable computer system 812 to communicate with one or more other computing devices. Such communication can occur via Input/Output (I/O) interfaces 822. Still yet, computer system 812 can communicate with one or more networks such as a local area network (LAN), a general wide area network (WAN), and/or a public network (e.g., the Internet) via network adapter 820. As depicted, network adapter 820 communicates with the other components of computer system 812 via bus 818. It should be understood that although not shown, other hardware and/or software components could be used in conjunction with computer system 812. Examples, include but are not limited to: microcode, device drivers, redundant processing units, external disk drive arrays, RAID systems, tape drives, and data archival storage systems, etc.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present detailed description has been presented for purposes of illustration and description, but is not intended to be exhaustive or limited to the form described. Many modifications and variations will be apparent to those of ordinary skill in the art without departing from the scope and spirit of the detailed description. The embodiments of the invention were chosen and described in order to best explain the principles of embodiments of the invention and the practical application, and to enable others of ordinary skill in the art to understand the various embodiments of the invention with various modifications as are suited to the particular use contemplated.

The diagrams depicted herein are illustrative. There can be many variations to the diagram or the steps (or operations) described therein without departing from the spirit of the embodiments of the invention. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the embodiments of the present invention.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments of the invention described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identification, the computer-implemented method comprising:
   biasing, using a control system, a crossbar array of resistive processing units (RPUs) under a midrange condition, the midrange condition causing resistances of the RPUs to result in a random output of low values and high values in about equal proportions;
   reinforcing, using the control system, the low values and the high values of the random output by setting the resistances of the RPUs to a state that forces the low values and the high values having resulted from the midrange condition, reinforcing the low values and the high values making the random output permanent even when the crossbar array of the RPUs is not biased under the midrange condition; and
   recording, using the control system, a sequence of the low values and the high values of the random output responsive to reinforcing the low values and the high values of the random output, wherein the crossbar array of the RPUs is configured to be authenticated by reading out a verification sequence that matches the random output, the verification sequence being read out under a different condition than the midrange condition.

2. The computer-implemented method of claim 1, wherein in response to receiving predefined voltages under the midrange condition, the RPUs generate a stochastic response.

3. The computer-implemented method of claim 1, wherein in response to receiving predefined voltages under the midrange condition, the RPUs generate a stochastic response of the low values and the high values in the about equal proportions.

4. The computer-implemented method of claim 1, wherein reinforcing the low values and the high values of the random output by setting the resistances of the RPUs to the state that forces the low values and the high values having resulted from the midrange condition comprises using voltage pulses under the midrange condition that drive the resistances of the RPUs.

5. The computer-implemented method of claim 1, wherein reinforcing the low values and the high values of the random output by setting the resistances of the RPUs to the state that forces the low values and the high values having resulted from the midrange condition comprises using voltage pulses to shift resistance values up and down to ensure the low values and the high values in the about equal proportions.

6. The computer-implemented method of claim 1 further comprising preventing the resistances of the RPUs from being subsequently programmed, responsive to recording the sequence of the low values and the high values of the random output.

7. A computer program product comprising a computer readable storage medium having program instructions embodied therewith, the program instructions executable by a processor to cause the processor to perform operations comprising:
   biasing a crossbar array of resistive processing units (RPUs) under a midrange condition, the midrange condition causing resistances of the RPUs to result in a random output of low values and high values in about equal proportions;
   reinforcing the low values and the high values of the random output by setting the resistances of the RPUs to a state that forces the low values and the high values having resulted from the midrange condition, reinforcing the low values and the high values making the random output permanent even when the crossbar array of the RPUs is not biased under the midrange condition; and
   recording a sequence of the low values and the high values of the random output responsive to reinforcing the low values and the high values of the random output, wherein the crossbar array of the RPUs is configured to be authenticated by reading out a verification sequence that matches the random output, the verification sequence being read out under a different condition than the midrange condition.

8. The computer program product of claim 7, wherein in response to receiving predefined voltages under the midrange condition, the RPUs generate a stochastic response.

9. The computer program product of claim 7, wherein in response to receiving predefined voltages under the midrange condition, the RPUs generate a stochastic response of the low values and the high values in the about equal proportions.

10. The computer program product of claim 7, wherein reinforcing the low values and the high values of the random output by setting the resistances of the RPUs to the state that forces the low values and the high values having resulted from the midrange condition comprises using voltage pulses under the midrange condition that drive the resistances of the RPUs.

11. The computer program product of claim 7, wherein reinforcing the low values and the high values of the random output by setting the resistances of the RPUs to the state that forces the low values and the high values having resulted from the midrange condition comprises using voltage pulses to shift resistance values up and down to ensure the low values and the high values in the about equal proportions.

12. The computer program product of claim 7 further comprising preventing the resistances of the RPUs from being subsequently programmed, responsive to recording the sequence of the low values and the high values of the random output.

13. A system comprising:
   a memory having computer readable instructions; and
   one or more processors for executing the computer readable instructions, the computer readable instructions controlling the one or more processors to perform operations comprising:

biasing a crossbar array of resistive processing units (RPUs) under a midrange condition, the midrange condition causing resistances of the RPUs to result in a random output of low values and high values in about equal proportions;

reinforcing the low values and the high values of the random output by setting the resistances of the RPUs to a state that forces the low values and the high values having resulted from the midrange condition, reinforcing the low values and the high values making the random output permanent even when the crossbar array of the RPUs is not biased under the midrange condition; and recording a sequence of the low values and the high values of the random output responsive to reinforcing the low values and the high values of the random output, wherein the crossbar array of the RPUs is configured to be authenticated by reading out a verification sequence that matches the random output, the verification sequence being read out under a different condition than the midrange condition.

14. The system of claim 13, wherein in response to receiving predefined voltages under the midrange condition, the RPUs generate a stochastic response.

15. The system of claim 13, wherein in response to receiving predefined voltages under the midrange condition, the RPUs generate a stochastic response of the low values and the high values in the about equal proportions.

16. The system of claim 13, wherein reinforcing the low values and the high values of the random output by setting the resistances of the RPUs to the state that forces the low values and the high values having resulted from the midrange condition comprises using voltage pulses under the midrange condition that drive the resistances of the RPUs.

17. The system of claim 13, wherein reinforcing the low values and the high values of the random output by setting the resistances of the RPUs to the state that forces the low values and the high values having resulted from the midrange condition comprises using voltage pulses to shift resistance values up and down to ensure the low values and the high values in the about equal proportions.

* * * * *